(12) United States Patent
White (10) Patent No.: US 8,893,581 B2
(45) Date of Patent: Nov. 25, 2014

(54) ADJUSTABLE PEDAL JOINT

(76) Inventor: Larry White, Sierra Vista, AZ (US)

(*) Notice: Subject to any disclaimer, the term of this patent is extended or adjusted under 35 U.S.C. 154(b) by 2003 days.

(21) Appl. No.: 12/077,244

(22) Filed: Mar. 17, 2008

(65) Prior Publication Data

US 2009/0229405 A1 Sep. 17, 2009

(51) Int. Cl.
*B62M 3/08* (2006.01)

(52) U.S. Cl.
CPC .................................. *B62M 3/08* (2013.01)
USPC ................... 74/594.7; 74/594.4; 74/594.1

(58) Field of Classification Search
USPC ............ 74/594.4–594.7; 482/57, 60, 79, 145, 482/146, 147, 63, 903, 908, 904, 80; 601/36
See application file for complete search history.

(56) References Cited

U.S. PATENT DOCUMENTS

| | | | |
|---|---|---|---|
| 4,599,915 A | 7/1986 | Hlavak | |
| 4,850,245 A | 7/1989 | Feamster | |
| 4,973,046 A * | 11/1990 | Maxwell | ......................... 482/60 |
| 5,860,330 A | 1/1999 | Code | |
| 6,003,408 A | 12/1999 | Hervig | |
| 7,228,761 B1 * | 6/2007 | Chen | ........................... 74/594.7 |

* cited by examiner

*Primary Examiner* — Daniel Yabut (57) ABSTRACT

A pedal adjuster which may be used with a pedal device such as a bicycle or stationary bicycle and which allows a user to tilt pedals relative to the horizontal plane in order to accommodate a foot that is everted or inverted relative to the vertical midline of the user's body. The illustrated embodiment of this invention includes an outer tube with a plurality of locking pin holes and a means for attachment to a crank arm, an inner rod housed coaxially within the outer tube and having a means for attachment to a pedal and a means for adjustably positioning the inner rod within the outer tube.

3 Claims, 8 Drawing Sheets

ADJUSTABLE PEDAL JOINT

BACKGROUND OF THE INVENTION

1. Field of the Invention

This invention is related in general to the field of cycling including any vehicle or device that requires the use of pedals, such as bicycles and exercise or stationary bicycles. In particular, this invention includes an outer hollow tube including a plurality of locking pin holes, an inner rod including at least one locking pin, a means for attaching a pedal to the inner rod, and a means for attaching the invention to a crank arm of a pedal device or vehicle.

2. Description of the Prior Art

In order to use a pedal of a conventional bicycle or exercise bicycle, one must generally push against the pedal in a downward direction. Typically, the plane of the pedal is horizontal or parallel to the ground and the user's foot is parallel to the plane of the pedal. For persons who have a physical condition wherein one or both feet or legs are either everted or inverted with respect to the vertical midline of the body, the use of a standard pedal can be problematic due to the unnatural position of such a user's foot, which may not be comfortably positioned parallel to the horizontal plane. For such a person, applying force to the pedal may be inefficient and may cause stress and injury to the joints of the legs and feet. It is therefore desirable to have a device which allows the pedal to tilt in such a manner as to be adjustable to fit the position of the user's foot.

Prior techniques for adjusting a pedal generally require modification of the pedal itself. For example, U.S. Pat. No. 4,599,915 discloses a structure that allows a pedal to tilt to accommodate the position of a user's foot. The structure so disclosed in U.S. Pat. No. 4,599,915 is a type of pedal that pivots on its platform. U.S. Pat. No. 6,003,408 discloses a pedal with cushioned multi-axis movement. However, the inventor of this instant invention believes there are better ways of achieving the desired result. Accordingly, there exists a need for a device that may be used with existing pedals and crank arms without further modification.

SUMMARY OF THE INVENTION

The invention disclosed herein utilizes an outer tube including a means for attachment to a crank arm and a plurality of locking holes and an inner rod housed coaxially within the outer tube, said inner rod having one or more locking pins and a means for attachment to a pedal.

The instant invention allows a user to adjust a pedal to accommodate a foot that is naturally inverted or everted relative to the vertical midline of the user's body. By attaching the invention to a crank arm and to a pedal, a user gains the ability to tilt the pedal about an axis generally parallel to the long axis of the bicycle or exercise bicycle.

Various other purposes and advantages of the invention will become clear from its description in the specification that follows and from the novel features particularly pointed out in the appended claims. Therefore, to the accomplishment of the objectives described above, this invention comprises the features hereinafter illustrated in the drawings, fully described in the detailed description of the preferred embodiments, and particularly pointed out in the claims. However, such drawings and description disclose just a few of the various ways in which the invention may be practiced and are not to be considered limiting on the invention.

DESCRIPTION OF THE INVENTION

This invention relates to an adjustable pedal connector comprising an outer tube housing a means for attachment to a crank arm and a plurality of locking holes, an inner rod housed coaxially within the outer tube, and the indicated inner rod having one or more locking pins or other means for securing a tilted pedal position, and a means for attachment to a pedal.

Figure 1:
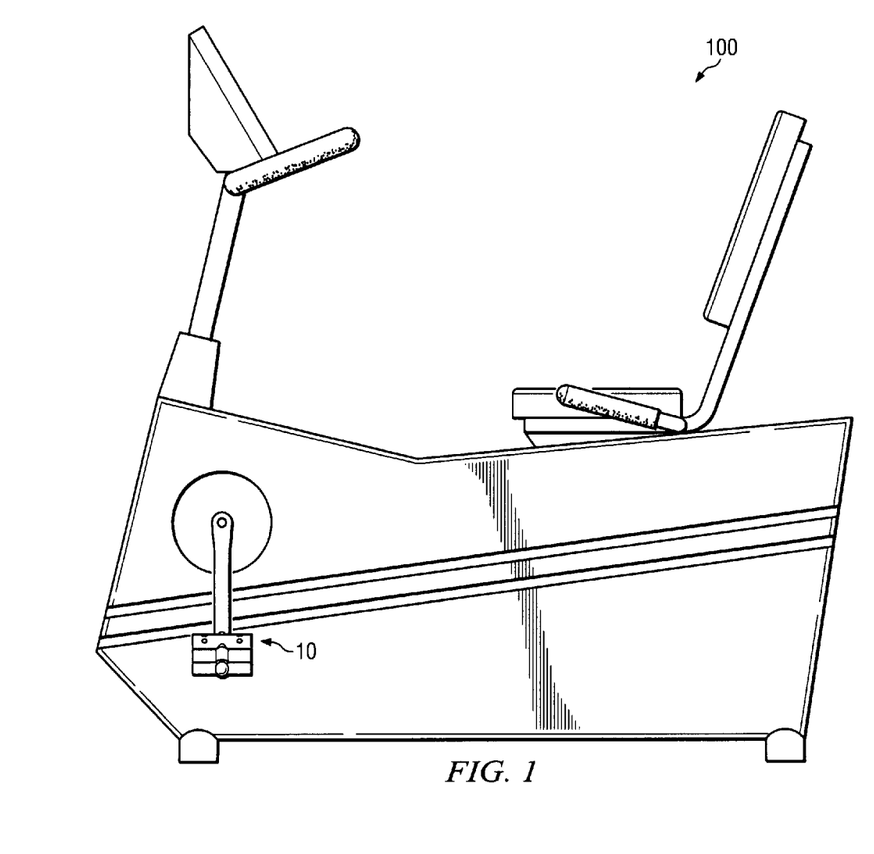
FIG. 1 is an illustration of a stationary bicycle 100 including the invention 10 attached between the pedal and the crank arm.

Referring to figures, wherein like parts are designated with like reference numerals and symbols, FIG. 1 is an illustration of a stationary bicycle 100 including the invention 10 attached to the stationary bicycle 100. Attachment of the invention to pedals on a stationary bicycle allows a user of the stationary bicycle to adjust the indicated pedals in such a manner as to accommodate an everted or inverted foot position. This is especially useful in a therapeutic or rehabilitative setting where a person may have a physical or medical condition that prevents that person from using pedals in a standard orientation. As the invention is separate from the pedals, a user may use an existing stationary bicycle in conjunction with the invention. The means for attaching the invention to a crank arm and the means for attaching the invention to a pedal may be modified as necessary to fit various models or types of stationary bicycle.

Figure 2:
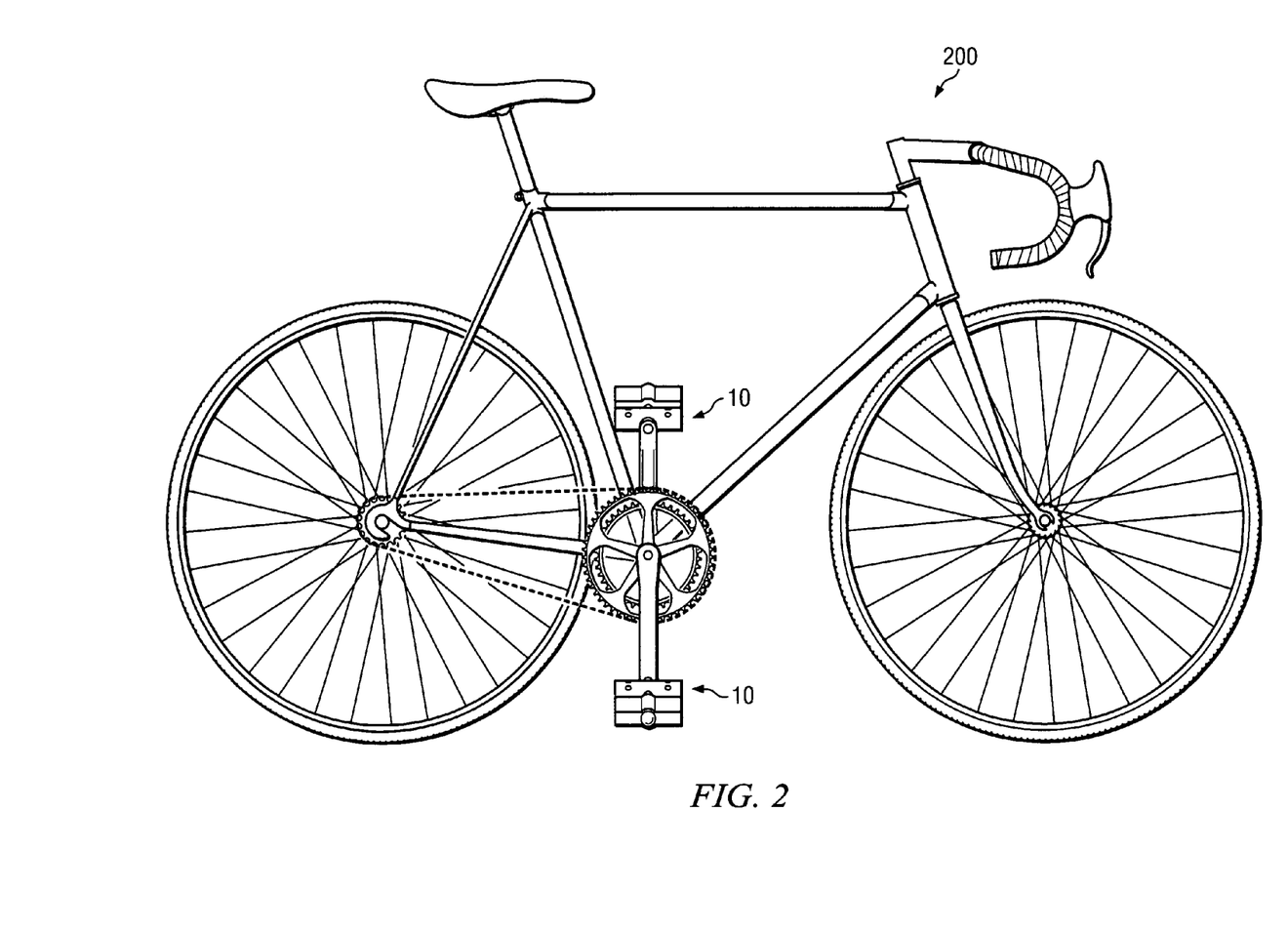
FIG. 2 is an illustration of a bicycle 200 including the invention 10 attached between each pedal and crank arm.
Figure 3:
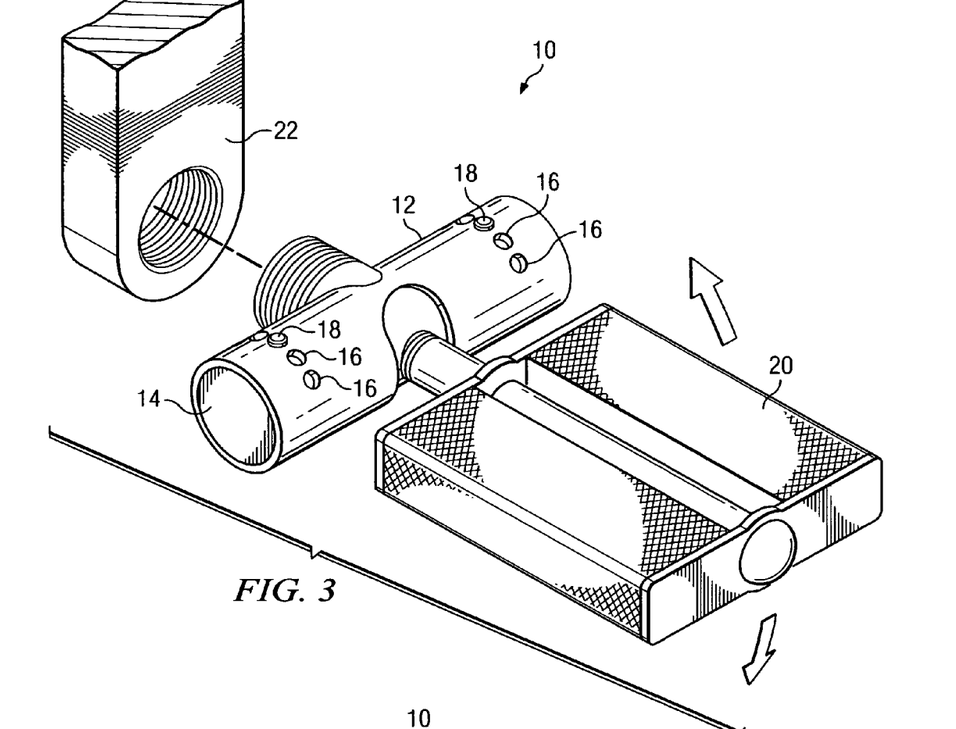
FIG. 3 is an illustration of the invention 10 comprising an outer tube 12, an inner rod 14, a plurality of locking holes 16, and two locking pins 18. The invention 12 is attached to a pedal 20 and is illustrated detached from a crank arm 22.

FIG. 2 is an illustration of the invention 10 attached to a typical bicycle 200. The invention allows a user to adjust pedals on the bicycle 200 such that the pedals may accommodate an everted or inverted foot position. As noted above, this may be useful in a therapeutic or rehabilitative setting where a bicycle in used in the course of treatment for a person with medical or physical condition that causes eversion or inversion of a foot or feet. In addition, a person with such an existing condition may, outside of any treatment, wish to ride a bicycle in comfort. The invention allows a person with everted or inverted foot or feet to adjust the pedals on any bicycle to the most comfortable position for the user's feet. The more comfortable position will also reduce the amount of stress on the person's joints and will make the application of force against the pedals more efficient because the person will be pushing against the pedals with each foot fully parallel to its corresponding pedal surface. The means for attaching the invention to a crank arm and the means for attaching the invention to a pedal may be modified as necessary to fit various models or types of bicycle. In this embodiment of the invention, the means for attaching the invention to a crank arm is illustrated in FIG. 3 and includes a threaded post disposed on the side of the outer tube 12 being inserted into a threaded hole of the crank arm 22. Also in this embodiment of the invention, the means for attaching the invention to a pedal is illustrated in FIG. 3 wherein a pedal 20 including a threaded post is inserted into a threaded hole of the inner rod 14. The threaded hole of the inner rod 14 is identified in FIG. 5 as an attachment point 11 for a pedal (not shown). FIG. 6 further illustrates the attachment point 11 as a threaded hole in the side of the inner rod 14. A means for attaching the inner rod 14 to the pedal adjuster 10 is best illustrated by referring to FIG. 3, FIG. 4A, and FIG. 5. The inner rod 14 including the attachment point 11, a pocket 15, a locking pin 18, and a spring 19 is placed within the outer tube 12 of the pedal adjuster 10. In this embodiment of the invention, in order to insert the inner rod 14 into the outer tube 12, the locking pin must be depressed into the pocket 15. Once inserted into the outer tube 12, the inner rod is positioned so that the locking pin 18 is aligned with a locking pin hole 16 of the outer tube 12, allowing the spring 19 to expand thereby displacing a portion of the locking pin 18 from the pocket 15 and allowing the displaced portion of the locking pin to protrude into the locking pin hole 16.

FIG. 3 is an illustration of a the invention 10 showing the outer tube 12 with a means for attachment to a crank arm 22 and a plurality of locking pin holes 16, and an inner rod 14 situated coaxially within the outer tube 12, the inner rod 14 having a means for attachment to a pedal 20 and at least one locking pin 18. The pedal 20 is attached to the inner rod 14 which may rotate within the outer tube 12 allowing the pedal 20 to tilt about an axis roughly parallel to the long axis of the bicycle.

In one embodiment of the invention, locking pins 18 are used in conjunction with locking pin holes 16 to hold the pedal 20 in a particular position. Other means, for example, bolts, may be used in place of locking pins to position the pedal 20 without changing the nature of the invention.

Figure 4A:
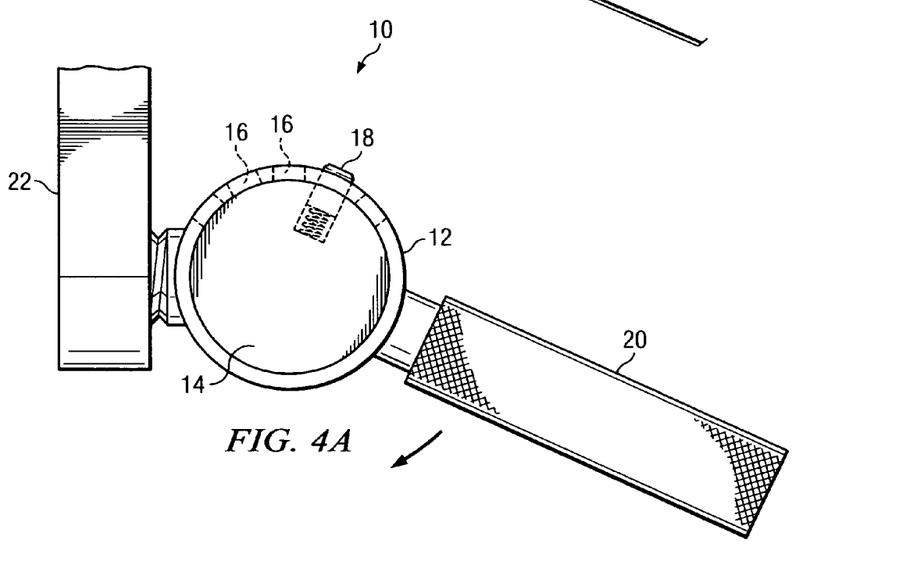
FIG. 4a is an illustration of a side view of the invention 10 attached to both a crank arm 22 and a pedal 20. The pedal 20 is in an everted orientation, such position corresponding to an everted position of a user's foot.
Figure 4B:
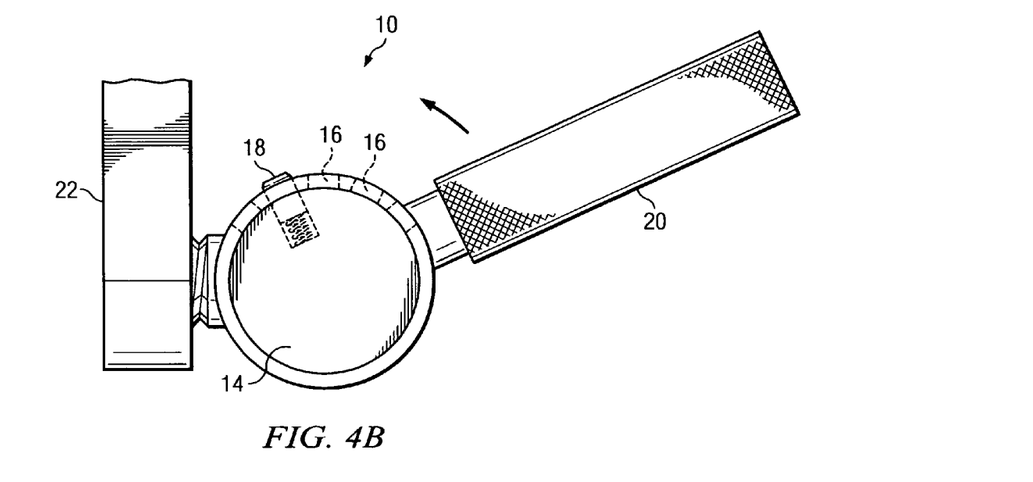
FIG. 4b is an illustration of a side view of the invention 10, as in FIG. 4a but with the pedal 20 in an inverted orientation, such position corresponding to an inverted position of a user's foot.

FIG. 4a is an illustration of a side view of the invention 10 attached on a first end to a crank arm 22 and on a second end to a pedal 20. A cut-out illustrates a locking pin 18 protruding through a locking pin hole 16. The outer edge of indicated pedal 20 is angled downward to accommodate an everted foot position. FIG. 4b illustrates the same view and elements present in FIG. 4a but the outer edge of pedal 20 is angled upward to accommodate an inverted foot position.

Figure 5:
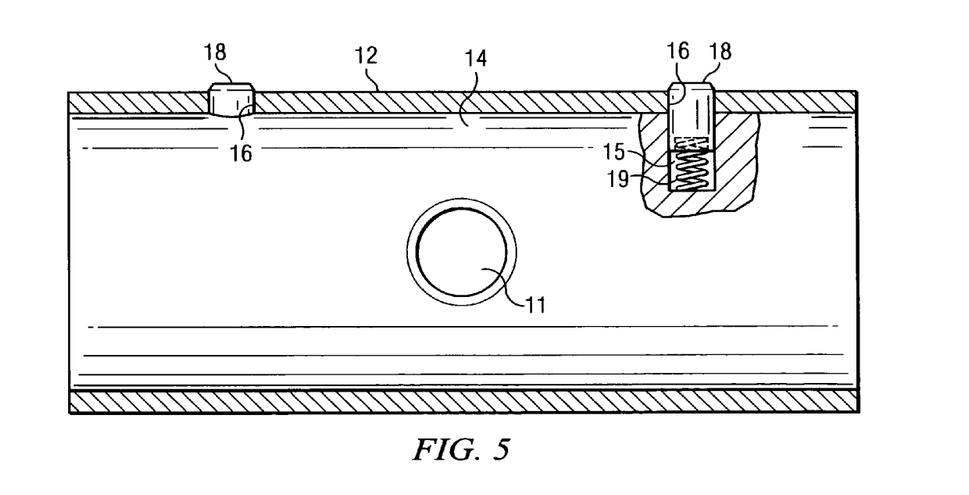
FIG. 5 is an illustration of a frontal view of the invention 10, showing a pedal attachment 11, an outer tube 12, an inner rod 14, locking holes 16, locking pins 18, and a cut away showing a pocket 15 for the locking pin 18 and a spring mechanism 19.
Figure 6:
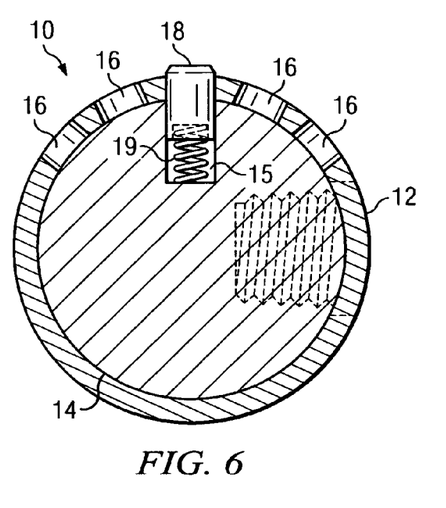
FIG. 6 is an illustration of a cross section of the invention 10 showing an outer tube 12 including a plurality of locking holes 16, an inner rod 14 including a pocket 15, a spring mechanism 19, and a locking pin 18.

FIG. 5 is an illustration of a front view of a part of the invention in isolation including an attachment point 11 for a pedal (not shown), an outer tube 12 with locking pin holes 16, an inner rod 14 with locking pins 18, and illustrated as a cutaway is a pocket 15 in the inner rod 14 and a spring 19 situated within the pocket 15.

FIG. 6 is an illustration of a cross section of a part of the invention 10 including an outer tube 12 with a plurality of locking pin holes 16, an inner rod 14 with a pocket 15, spring 19, and locking pin 18.

Figure 7:
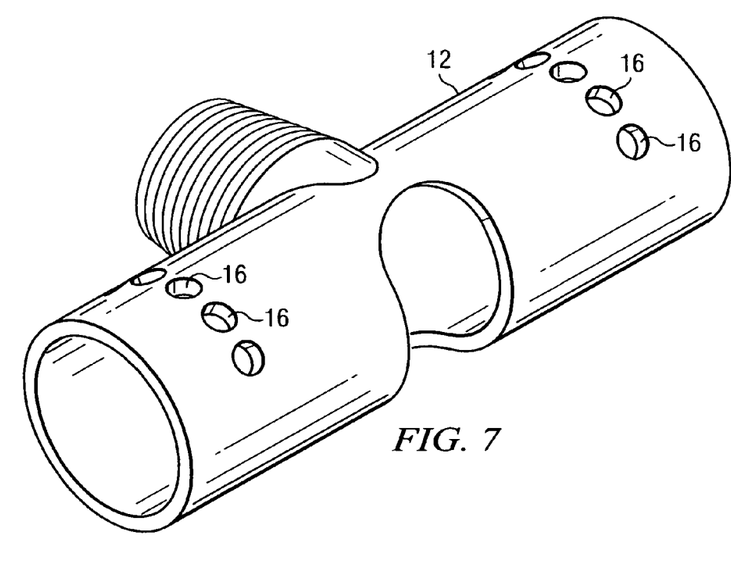
FIG. 7 is an illustration of an outer tube 12 including a plurality of locking holes 16.

FIG. 7 is an illustration of only the outer tube 12 of the invention including locking pin holes 16.

Figure 8:
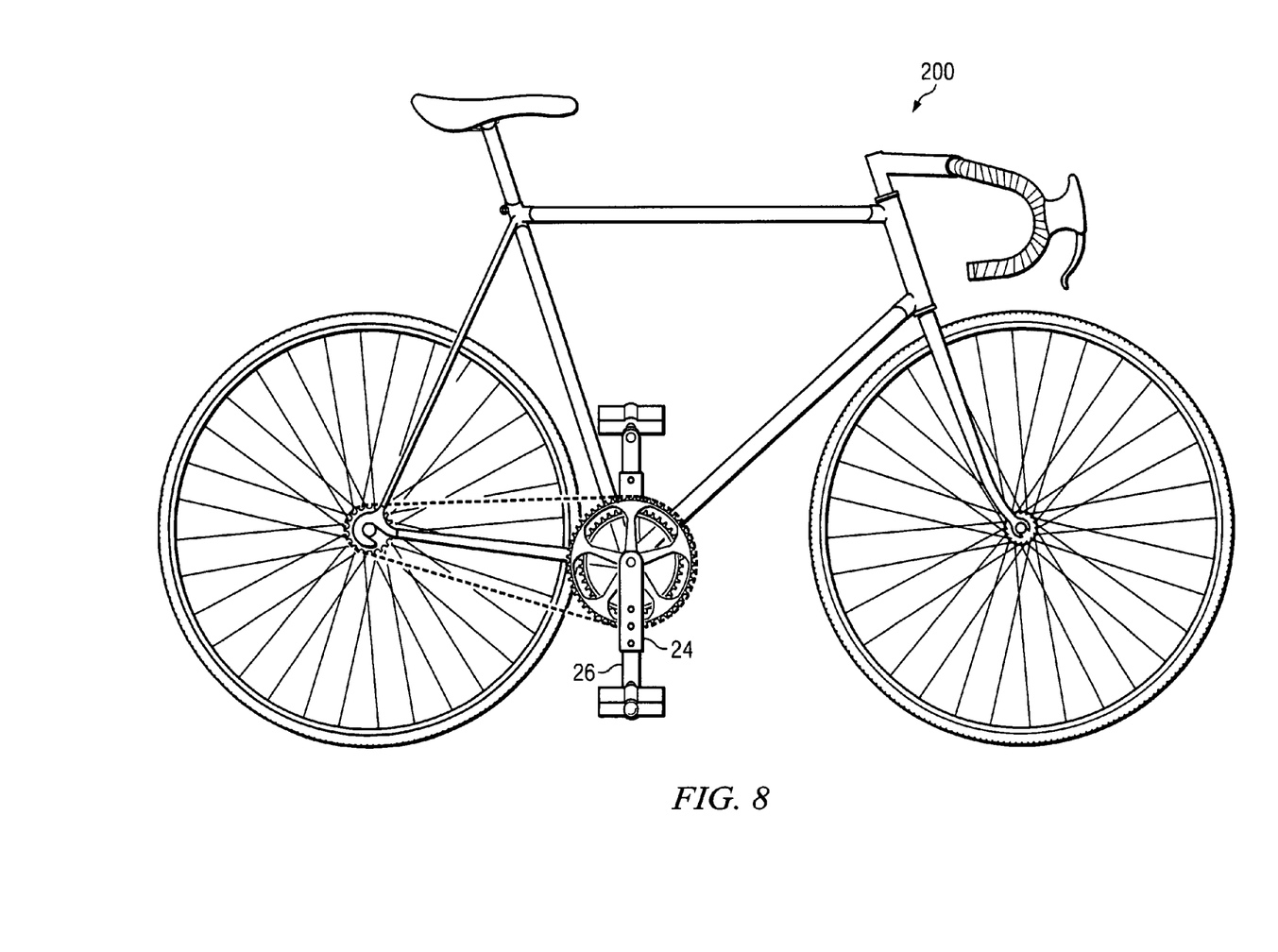
FIG. 8 is an illustration of a bicycle 200 including a hollow crank arm 24 housing an inner rod 26 and a means for extending the inner rod 26 from the crank arm 24.

FIG. 8 is an illustration of a bicycle 200 including a hollow crank arm 24 housing an inner crank arm 26 and a means for extending the inner crank arm 26 from the crank arm 24. In order to comfortably position a user's foot on a tilted pedal, it may be necessary to adjust the length of the crank arm. Accordingly, a means for extending the inner crank arm 26 from the hollow crank arm 24 includes the inner rod 26 being slidably and axially adjustable within the hollow crank arm 24. The modified crank arm 24 and 26 illustrated in FIG. 8 allows a user to adjust the crank arm length. This modification can be used with any pedal crank of a bicycle or stationary bicycle.

Figure 9:
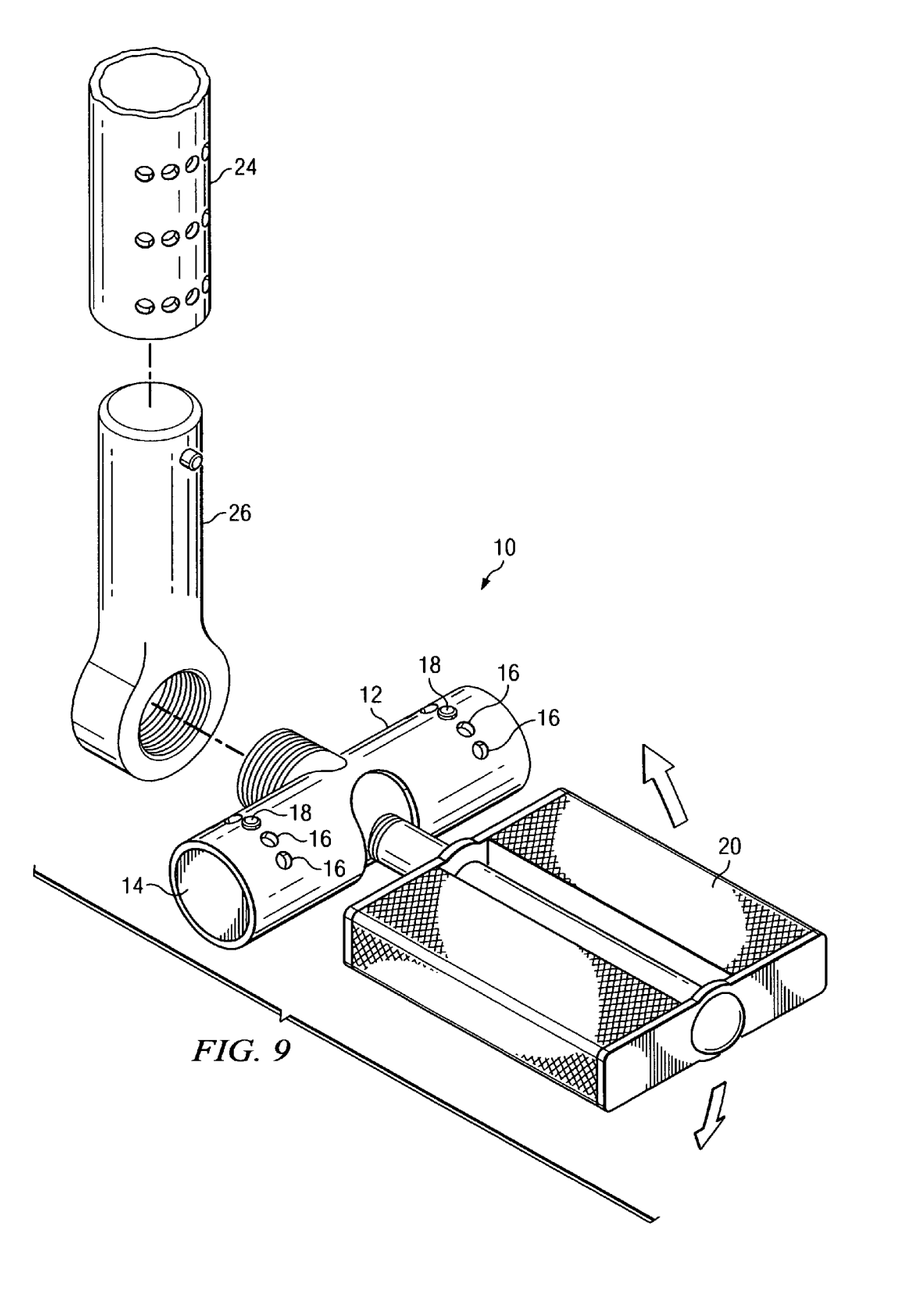
FIG. 9 is an illustration of the hollow crank arm 24, illustrated in FIG. 8, including inner rod 26 and a pedal 20.

FIG. 9 is an illustration of the hollow crank arm 24, illustrated in FIG. 8, including inner crank arm 26 and a pedal 20, illustrating the means of attachment of the pedal 20 to the crank arm inner crank arm 26.

Figure 10:
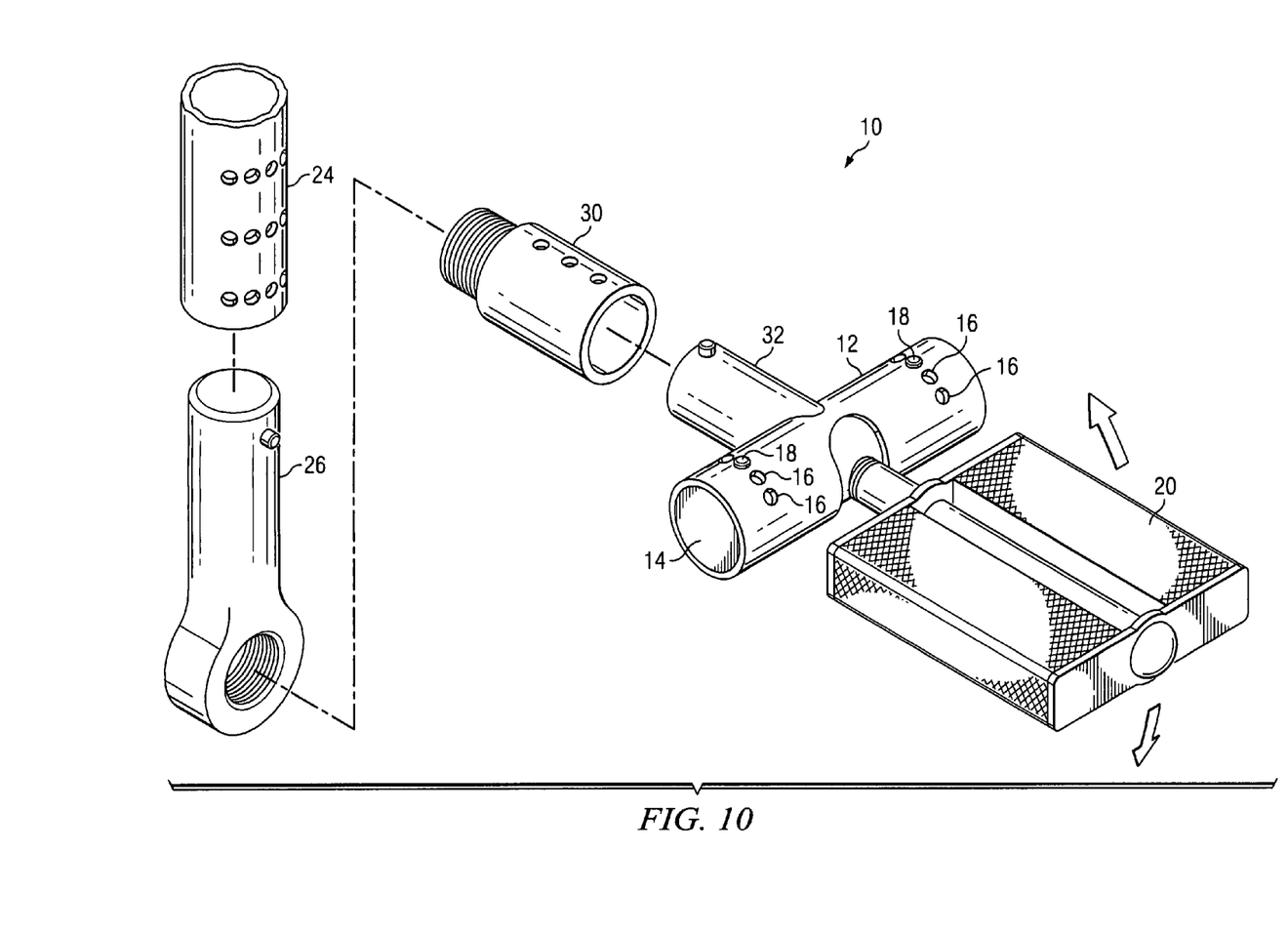
FIG. 10 is an illustration of the hollow crank arm, illustrated in FIGS. 8 and 9, including inner rod 26, a hollow extension tube 30 housing an inner extension rod 32, and the inner extension rod 32 connected to the invention 10, which includes a hollow outer tube 12, plurality of locking holes 16, inner rod 14, at least one locking pin 18, and a pedal 20.

FIG. 10 is an illustration of the hollow crank arm, illustrated in FIGS. 8 and 9, including inner crank arm 26, a hollow extension tube 30, housing an inner extension rod 32, and the inner extension rod 32 connected to the invention 10, which includes a hollow outer tube 12, plurality of locking holes 16, inner rod 14, at least one locking pin 18, and a pedal 20. In addition to extending the crank arm 24 and 26, it may be necessary to extend the distance between the pedal 20 and the vertical portion of the crank arm 24 and 26. An extension mechanism for the bicycle crank arm includes the extension tube 30 and extension rod 32 which allows a user to adjust the horizontal distance of the pedal 20 from the crank arm 24 and 26 to an appropriate position to accommodate a degree of tilt achieved using the invention 10. In this embodiment of the invention, a means for attaching a first end of the extension mechanism to a crank arm includes inserting a threaded end of the extension tube 30 into a threaded hole of the inner rod 26. A means for attaching a second end of the extension mechanism to the outer hollow tube of the pedal adjuster includes inserting the inner extension rod 32 of the hollow outer tube 12 into the hollow extension tube 30.

The present invention may be embodied in other specific forms without departing from its spirit or essential characteristics. As noted above, the means for attaching the invention to a crank arm and the means for attaching the invention to a pedal may be modified to fit particular crank arms and or particular pedals without changing the basic nature of the invention. Likewise, the means for tilting the pedal using locking pins and corresponding locking pin holes in the illustrated embodiment of the invention may be modified without affecting the essential characteristics of the invention. Those skilled in the art may utilize other embodiments of the invention to better serve particular situations. For example, in certain circumstances it may be preferable to employ threaded bolts or a ratchet mechanism in place of locking pins to secure the tilt position of the pedals. The described embodiments are to be considered in all respects only as illustrative and not restrictive. All changes which come within the meaning and range of equivalency of the claims are to be embraced within their scope.

I claim:

1. A pedal adjuster, comprising:
   an outer tube comprising a means for attaching the pedal adjuster to a crank arm of a bicycle;
   an inner rod comprising a means for attaching the pedal adjuster to a pedal,
   wherein the inner rod resides within the outer tube and pivots within the outer tube;
   the inner rod comprising a spring-loaded locking pin;
   wherein, upon pivoting the inner rod within the outer tube, the locking pin is then used in conjunction with a locking pin hole so that the locking pin holds the pedal in a particular position.

2. The pedal adjuster of claim 1, wherein the crank arm of the bicycle comprises:
   a hollow crank arm tube; and
   an inner crank arm comprising a means for extending the inner crank arm from within the hollow crank arm tube;
   a means for attaching the inner crank arm to the pedal adjuster.

3. The pedal adjuster of claim 1, further comprising:

an extension mechanism connected to a bicycle crank arm, the extension mechanism comprising:

a hollow extension tube and an inner extension rod comprising a means for extending the inner extension rod from within the hollow extension tube;

a means for attaching a first end of the extension mechanism to a crank arm; and a means for attaching a second end of the extension mechanism to the outer hollow tube of the pedal adjuster.

* * * * *